United States Patent Office
3,359,268
Patented Dec. 19, 1967

3,359,268
SUBSTITUTED PHTHALAZINES AND INTERMEDIATES OBTAINED IN THE SYNTHESIS THEREOF
Alan Frederick Turner, Wheathampstead, and David Gordon Parsons, Hertford, England, assignors to Vantorex Limited, Loughborough, England, a British company
No Drawing. Filed June 28, 1966, Ser. No. 561,046
8 Claims. (Cl. 260—250)

This invention relates to compositions of matter classified in the art of chemistry as substituted phthalazines and to intermediates obtained in the synthesis thereof.

The invention sought to be patented, in its final product composition aspect, is described as residing in the concept of a chemical compound having a molecular structure in which the phthalazine nucleus bears a 1,2-fused ring substituent of the formula:

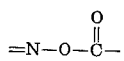

the nitrogen atom of which is attached to the 1-position of the nucleus and the carbonyl group to the 2-position.

The invention sought to be patented, in its intermediate product composition aspect, is described as residing in the concept of a chemical compound having a molecular structure wherein the phthalazine nucleus bears at the 1-position a substituent of the formula —NH—O—CO—O—lower alkyl.

As used throughout this application the terms "lower alkyl" and "lower alkoxy" embrace both straight and branched chain alkyl and alkoxy radicals, respectively, containing from 1 to 6 carbon atoms, for example, but without limitation, methyl, ethyl, n-propyl, isopropyl, n-butyl, tert-butyl, n-amyl, sec-amyl, n-hexyl, 2-ethylbutyl, 2,3-dimethylbutyl and the like in the case of "lower alkyl" and methoxy, ethoxy, n-propoxy, isopropoxy, n-butoxy, tert-butoxy, n-amyloxy, sec-amyloxy, n-hexyloxy, 2-ethylbutoy, 2,3-dimethylbutoxy and the like in the case of "lower alkoxy," and the term "halo" embraces bromo, chloro, fluoro and iodo.

The tangible embodiments of this invention, in both its final product and intermediate composition aspects, possess the inherent general physical characteristics of being solid crystalline materials. Infrared spectral data and elemental analysis, taken together with the nature of the starting materials and mode of synthesis, positively confirm the structure of the compounds sought to be patented.

The tangible embodiments of this invention, in its final product composition aspect, also possess the inherent applied use characteristics of having significant pharmacological activity as analgesic and anti-inflammatory agents as determined by recognized and accepted pharmacological test procedures. The tangible embodiments of this invention, in its intermediate product composition aspect, possess the inherent applied use characteristics of being chemical intermediates in the synthesis of the tangible embodiments of the invention in its final product composition aspect.

The manner and process of making and using the invention will now be generally described so as to enable one skilled in the art of chemistry to make and use the same as follows:

The conversion of the starting material to the tangible embodiments of this invention is carried out as set forth in the following reaction sequence:

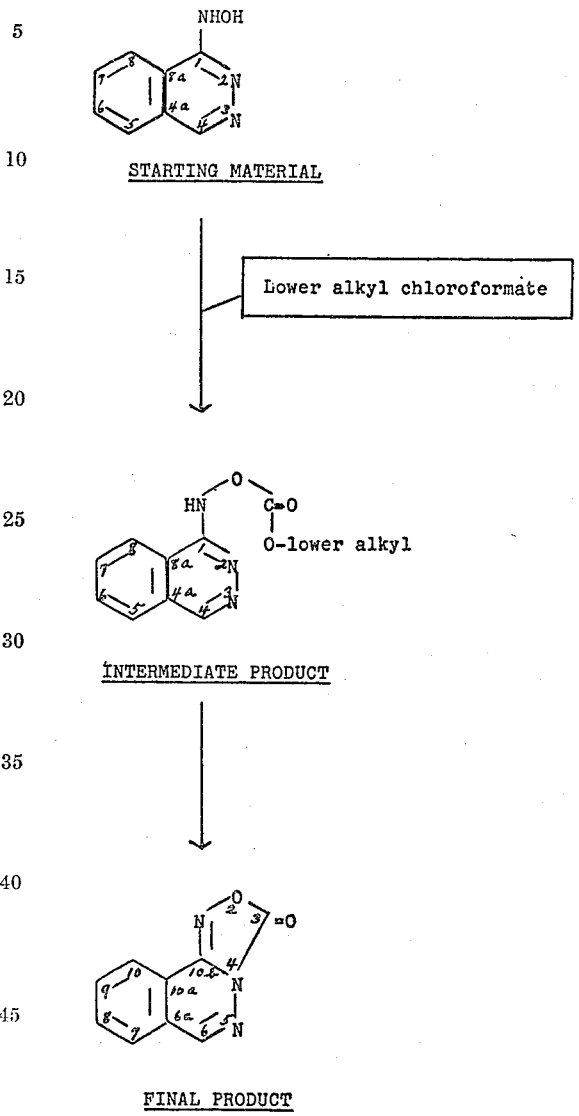

The starting materials for the preparation of the tangible embodiments of this invention are 1-hydroxylaminophthalazines that are prepared by refluxing a 1-halophthalazine with hydroxylamine in the presence of an inert solvent. Such 1-hydroxylaminophthalazines are described and claimed in our application Ser. No. 561,037 entitled "Substituted Phthalazines," filed concurrently herewith.

In carrying out the above-described reaction sequence, starting materials in which the hydrogen atom at the 4-position of the 1-hydroxylaminophthalazine is replaced by a lower alkyl, lower alkoxy, di-lower alkylamino-lower alkoxy, phenyl, phenyl-lower alkyl, pyridyl-lower alkyl, carbo-lower alkoxy-lower alkyl, carbamyl-lower alkyl or anilino radical are the full equivalents of the specific 1-hydroxylaminophthalazine starting material depicted hereinabove in the reaction sequence. Their use yields intermediates and final products bearing corresponding substitution at the 4-position which are the full equivalents of the specific 1-carbo-lower alkoxyhydroxylaminophthalazine intermediate and 3-keto-3H-[1,2,4]oxadiazolo[3,4-a]phthalazine final product depicted hereinabove. Such intermediates and final products have the same utility as the specific intermediate and final product depicted and are included within the scope of this invention.

According to the reaction sequence depicted above, the starting material is converted to the tangible embodiments of this invention, in its intermediate and final product compositon aspects, by means of a two-stage reaction; the first stage comprising the formation of a carbo-lower alkoxy ester and the second comprising a ring closure or cyclization. The ester intermediate is formed by treatment of the starting material for several hours at room temperature with a lower alkyl chloroformate (for example, ethyl chloroformate) in the presence of an inert organic solvent such as pyridine. The ester thus formed may, if desired, be separated but does not require isolation and purification before proceeding with the cyclization. The carbethoxy ester intermediate, thus obtained, is then heated for several hours to effect ring closure in the presence of a non-reactive, inert organic solvent. Dimethylformamide has been found to be a particularly useful solvent. The 3-keto-3H-[1,2,4]oxadiazolo[3,4-a]phthalazine resulting from the ring closure or cyclization comprises the tangible embodiments of this invention, in its final product composition aspect, and is isolated, recovered and purified by conventional techniques.

Starting materials wherein the benzene ring of the phthalazine nucleus bears one or more nitro, halo, amino, di-lower alkylamino, carboxy, lower alkyl or lower alkoxy groups, or wherein the 4-position bears a phenyl or phenylalkyl substituent bearing one or more nitro, halo, amino, di-lower alkylamino, carboxy, lower alkyl or lower alkoxy groups, are prepared by the same techniques set forth in my patent application Ser. No. 561,037 entitled "Substituted Phthalazines," filed concurrently herewith and referred to hereinabove, and are the full equivalents of the specific starting materials depicted hereinabove. Their use in the above-described reaction sequence results in the preparation of products having nitro, halo, amino, carboxy, lower alkyl or lower alkoxy substituents on the benzene rings at the same place as in the starting materials, such products having the same utility as the specific products depicted in the above reaction sequence.

The tangible embodiments of this invention can be combined with conventional pharmaceutical diluents and carriers to form such dosage forms as tablets, suspensions, solutions, suppositories and the like.

The best mode contemplated by the inventors for carrying out the invention will now be set forth as follows:

EXAMPLE I

*6-methyl-3-keto-3H-[1,2,4]oxadiazolo[3,4-a]phthalazine*

(A) *1 - carbethoxyhydroxylamino - 4 - methylphthalazine.*—A suspension of 1-hydroxylamino-4-methylphthalazine (5.0 g.) in dimethylformamide (30 ml.) is treated dropwise with ethyl chloroformate (3.0 g.). The yellow color of the suspension quickly fades and the mixture becomes warm. After shaking for 15 minutes, the mixture is allowed to stand at room temperature overnight. The product is obtained by pouring into ice water, washing and crystallizing. The product is recrystallized from ethanol to yield 3.3 g. (47%) pale yellow, fine needles, M.P. 220°–225° C. (with decomposition).

*Analysis.*—Calculated for $C_{12}H_{13}N_3O_3$: C, 58.3%; H, 5.3%; N, 17.0%. Found: C, 57.8%; H, 5.1%; N, 17.4%.

(B) *6 - methyl - 3 - keto-3H-[1,2,4]oxadiazolo[3,4-a]phthalazine.*—A solution of 1-carbethoxyhydroxylamino-4-methylphthalazine (3.0 g.), prepared as described in A above, in dimethylformamide (10 ml.) is heated at 140°–145° C. for 30 minutes. The brownish crystalline product that develops is twice recrystallized from chloroform and decolorized to yield 0.62 g. (25%) of white crystals, M.P. 222°–224° C.

*Analysis.*—Calculated for $C_{10}H_7N_3O_2$: C, 59.7%; H, 3.5%; N, 20.9%. Found: C, 59.9%; H, 3.5%; N, 21.8%.

The following examples illustrate the preparation of other tangible embodiments of this invention:

EXAMPLE 2

*6-phenyl-3-keto-3H-[1,2,4]oxadiazolo[3,4-a]phthalazine*

A solution of 1-hydroxylamino-4-phenylphthalazine (14.9 g.) in pydidine (250 ml.) cooled to 5° is treated dropwise with ethylchloroformate (10.0 g.) with stirring. After allowing the mixture to remain at room temperature for 18 hours the pyridine is removed by vacuum distillation and the crude residue dissolved in dimethylformamide (100 ml.) and then heated for 1½ hours at 140°. The cooled product is poured into water and crystallized twice from dimethylformamide to yield 7.0 g. (42%) colorless needles, M.P. 229°–231° C.

*Analysis.*—Calculated for $C_{15}H_9N_3O_2$: C, 68.4%; H, 3.5%; N, 16.0%. Found: C, 68.0%; H, 3:5%; N, 16.3%.

EXAMPLE 3

*6-benzyl-3-keto-3H-[1,2,4]oxadiazolo[3,4-a]phthalazine*

1 - hydroxylamino - 4 - benzylphthalazine (29.0 g.) is treated with ethyl chloroformate and the resulting intermediate cyclized by the procedures described in Example 2 to yield, after recrystallization from ethanol, 19.8 g. product (61%), M.P. 169°–171° C.

*Analysis.*—Calculated for $C_{16}H_{11}N_3O_2$: C, 69.3%; H, 4.0%; N, 15.2%. Found: C, 69.2%; H, 4.1%; N, 14.8%.

EXAMPLE 4

*6-n-butyl-3-keto-3H-[1,2,4]oxadiazolo-oxadiazolo[3,4-a]phthalazine*

1 - hydroxylamino - 4 - (p-methoxybenzyl)phthalazine (20.0 g.) is treated with ethyl chloroformate and the desulting intermediate cyclized by the procedures described in Example 2 to yield, after recrystallization from ethanol and dimethylformamide, 14.7 g. product (67%), M.P. 190°–192° C.

*Analysis.*—Calculated for $C_{17}H_{13}N_3O_3$: C, 66.4%; H, 4.3%; N, 13.7%. Found: C, 66.0%; H, 4.3%; N, 13.8%.

EXAMPLE 5

*6-(p-methoxybenzyl)-3-keto-3H-[1,2,4]-[3,4-a]phthalazine*

4 - n - butyl - 1 - hydroxylaminophthalazine (12.0 g.) is treated with ethyl chloroformate and the resulting intermediate is crystalized by the procedures described in Example 2 to yield 9.8 g. (73%) of the product, M.P. 128°–129° C.

*Analysis.*—Calculated for $C_{13}H_{13}N_3O_2$: C, 64.2%; H, 5.4%; N, 17.3%. Found: C, 64.1%; H, 5.3%; N, 17.5%.

EXAMPLE 6

*3-keto-3H-[1,2,4]oxadiazolo[3,4-a]phthalazine*

1 - hydroxylaminophthalazine is treated with ethyl chloro-formate and the resulting intermediate cyclized by the procedures described in Example 2 to yield the product M.P. 228°–230° C.

*Analysis.*—Calculated for $C_9H_5N_3O_2$: C, 57.8%; H, 2.7%; N, 22.5%. Found: C, 58.2%; H, 2.9%; N, 22.2%.

The subject matter which the applicants regard as their invention is particularly pointed out and distinctly claimed as follows:

We claim:

1. 3-keto-3H-[1,2,4]oxadiazolo[3,4-a]phthalazine.

2. 6-(lower alkyl)-3-keto-3H-[1,2,4]oxadiazolo-[3,4-a]phthalazine.

3. 6-methyl-3-keto-3H-[1,2,4]oxadiazolo[3,4-a]-phthalazine.

4. 6-(n-butyl)-3-keto-3H-[1,2,4]oxadiazolo[3,4-a]-phthalazine.

5. 6-phenyl-3-keto-3H[1,2,4]oxadiazolo[3,4-a]phthalazine.

6. 6-(phenyl-lower alkyl)-3-keto-3H[1,2,4]oxadiazolo-[3,4-a]phthalazine.

7. 6-benzyl-3-keto-3H-[1,2,4]oxadiazolo[3,4-a]-phthalazine.

8. 6-(p-methoxybenzyl)-3-keto-3H-[1,2,4]oxadiazolo-[3,4-a]phthalazine.

References Cited

UNITED STATES PATENTS

| | | | |
|---|---|---|---|
| 3,240,781 | 3/1966 | Turner et al. | 260—250 |
| 3,274,185 | 9/1966 | Sigal et al. | 260—250 |

OTHER REFERENCES

Wertheim: Textbook of Organic Chemistry, pp. 763–764 (1945) second edition.

NICHOLAS S. RIZZO, *Primary Examiner.*